United States Patent [19]
Sexton et al.
[11] Patent Number: 4,929,966
[45] Date of Patent: May 29, 1990

[54] CONTINUOUS INK JET PRINTER WITH A GRAVITY DRAIN, CATCHER RETURN SYSTEM

[75] Inventors: Gregory J. Sexton, Dayton; Gregory M. Kopp, Huber Heights, both of Ohio

[73] Assignee: Eastman Kodak Company, Rochester, N.Y.

[21] Appl. No.: 292,846

[22] Filed: Jan. 3, 1989

[51] Int. Cl.[5] .............................................. G01D 15/18
[52] U.S. Cl. .................................. 346/75; 346/140 R
[58] Field of Search .............................. 346/75, 140 R

[56] References Cited

U.S. PATENT DOCUMENTS 3,512,173 5/1970 Damouth .............................. 346/75
4,081,804 3/1978 Van Breemen et al. ............. 346/75
4,160,982 7/1979 Keur ...................................... 346/75
4,305,079 12/1981 Mix ....................................... 346/75
4,360,817 11/1982 Arway et al. ......................... 346/75

*Primary Examiner*—Clifford C. Shaw
*Assistant Examiner*—Gerald E. Preston
*Attorney, Agent, or Firm*—John D. Husser

[57] ABSTRACT

A gravity ink return system for a continuous ink jet printer of the kind having droplet generator means for directing streams of ink droplets along a print path and ink supply means including an ink reservoir and means for supplying ink from said reservoir to said generator. The gravity return system includes a catcher having an ink return inlet located laterally adjacent the droplet print path for receiving non-print droplets deflected from said path and a discharge passage constructed and located to slope downwardly from said inlet to an outlet of the catcher. A return conduit slopes continuously downwardly from said catcher outlet to the ink reservoir.

3 Claims, 5 Drawing Sheets

CONTINUOUS INK JET PRINTER WITH A GRAVITY DRAIN, CATCHER RETURN SYSTEM

FIELD OF THE INVENTION

The present invention relates to ink jet printers of the continuous type and more particularly to ink circulation constructions that eliminate the need for vacuum return of the non-used droplets that are caught by the catcher device of such printers.

BACKGROUND OF INVENTION

In continuous ink jet printing apparatus streams of uniformly spaced ink drops are created by imposing predetermined vibrations upon liquid ink filaments issuing from an orifice plate. The filaments are formed by supplying ink under pressure to a print head cavity that is iin communication with the orifice plate. Information is imparted to the droplet streams by selective non-charging or charging and deflection of droplets. A portion of the droplets pass to the recording medium but there are a substantial number of non-printing droplets that are intercepted by a catcher device and returned for recirculation. Often the print head cavity has an outlet other than the orifice plate (e.g. to facilitate dynamic pressure control within the cavity at start-up), and the apparatus ink supply system also recirculates such ink flow. In many applications a variety of other fluid couplings to the ink reservoir may be used.

For example, a common practice in continuous ink jet printers is to provide a vacuum system that is coupled to the interior of the ink supply reservoir. The reduced pressure in the reservoir is used to return ink from a print head outlet line and/or from a home station where start-up and cleaning operations can occur. Print head outlet and home station ink can be returned to the reservoir without vacuum source assist; however, heretofore a reduced pressure has been required for returning ink from the printer's droplet catcher device, so the vacuum source is also used for other return lines.

There are several disadvantages connected to the provisoin of such an ink reservioir vacuum system. For example, the air withdrawn from the ink reservoir contains an ink mist that must be collected in the ink trap (rather than vented to the atmosphere). If the ink trap does not effectively remove the ink from the air, the mist can enter the vacuum pump, dry and cause a failure or unstable operation of the vacuum pump. The ink that does collect in the ink trap is not suitable for printing and therefore is wasted. Also, as a result of such ink collection, a service call is needed to drain the ink trap.

Another disadvantage is that the negative pressure in the ink reservoir must be regulated, e.g. by a vacuum regulator. Such regulators require adjustment when the fluid system is installed. Moreover, the regulator setting must remain within an adjustment window that is determined empirically and subject to change. That is, the adjustment window is a function of the restrictions in the fluid return lines and such restrictions vary with time and can cause the vacuum regulator to be misadjusted vis-a-vis the adjustment window. In addition, the total cost of a vacuum system, which includes parts, assembly, calibration, and service constitute a considerable portion of the total fluid system cost.

U.S. Pat. No. 4,614,948 describes several continuous ink jet printer circulation systems which are aimed toward avoiding the disadvantages described above. In one described system a venturi pump is uniquely designed to utilize bypass ink flow to induce ink return from the system's catcher. In another embodiment (see FIG. 4 of '948 patent), it is suggested that caught ink can also be returned to the reservoir by coupling to a restrictor-induced line pressure drop or by gravity. Because some inks have foaming problems when subjected to low pressure inducing venturi and restrictor means, gravity return would be a most desirable alternative for obviating the above-described disadvantages of vacuum pumps.

SUMMARY OF THE INVENTION

Thus, one important object of the present invention is to provide continuous ink jet printer configurations which will simply and reliably effect gravity return of caught ink droplets from the catcher to the ink reservoir, without the use of a vacuum system. In one aspect, the present invention achieves this general object by the provision of improved printer constructions that enable such gravity return of caught ink to the ink supply reservoir. Such constructions of the present invention obtain significant advantages in simplicity, reliability and cost vis-a-vis prior art vacuum-return systems.

In one embodiment the present invention constitutes an improved ink return system for a continuous ink jet printer of the kind having a droplet generator for directing streams of ink droplets along a print path, an ink supply reservoir and means for supplying ink from the reservoir to the droplet generator. The return system includes: (i) a catcher having a catcher inlet located laterally adjacent the droplet print path for receiving non-print droplets, a catcher outlet and a discharge passage constructed and located to slope downwardly from the catcher inlet to the catcher outlet; and (ii) a return conduit that slopes continuously downwardly from the catcher outlet to the ink reservoir.

BRIEF DESCRIPTION OF THE DRAWINGS

The subsequent description of preferred embodiments refers to the attached drawings wherein.

DETAILED DESCRIPTION OF PREFERRED EMBODIMENTS

Figure 1:
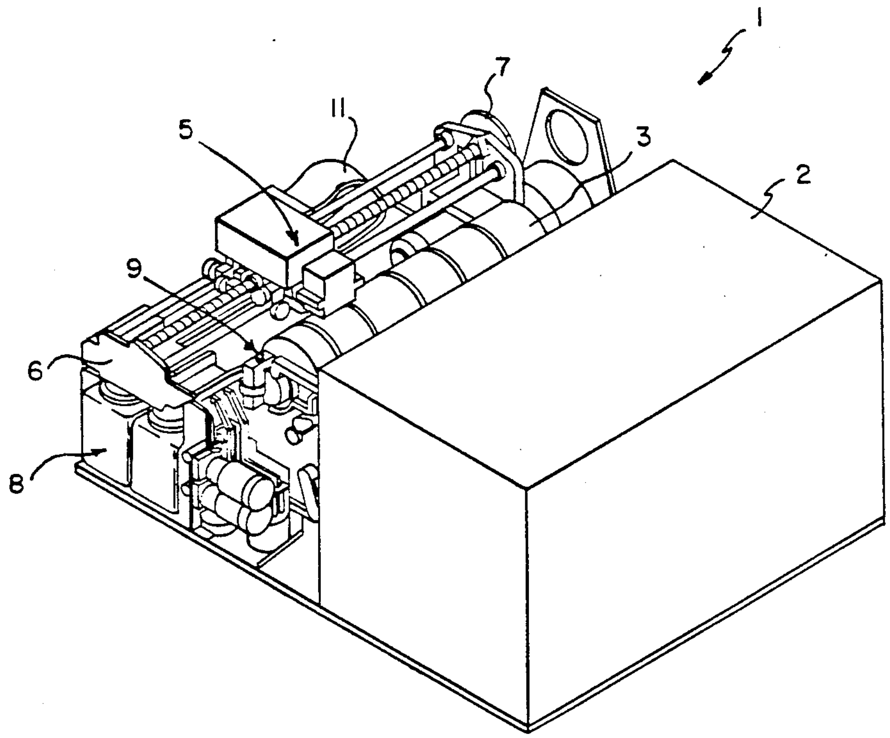
FIG. 1 (prior art)
FIG. 1 is a perspective view of one prior art continuous ink jet printer apparatus in which the present invention is useful.

FIG. 1 illustrates an exemplary prior art ink jet printer apparatus 1 of a type that can advantageously incorporate the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge 8. A storage and start-up station 9 is constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the operative cycle of apparatus 1.

Figure 2:
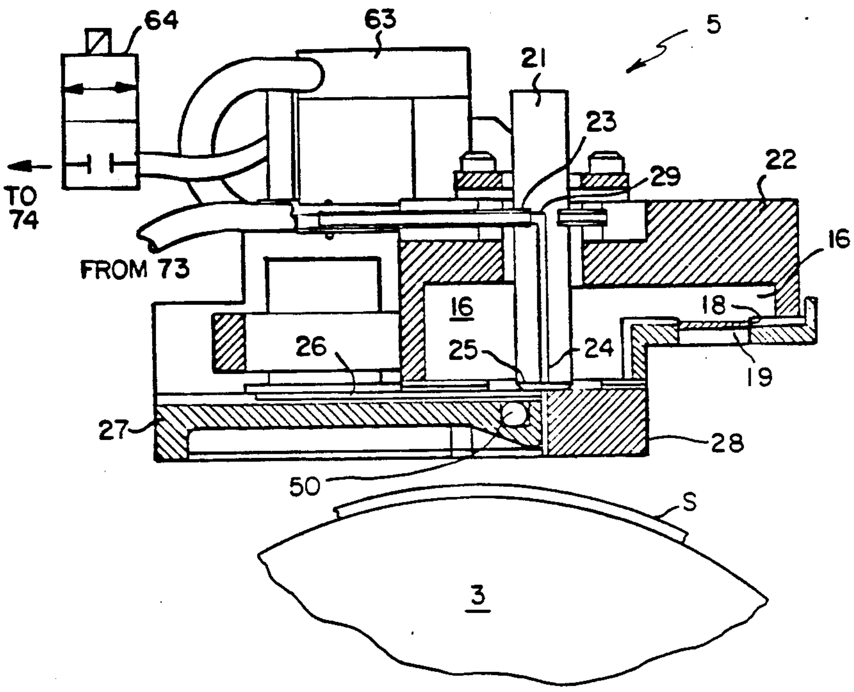
FIG. 2 (prior art)
FIG. 2 is a cross-sectional view showing exemplary print head structure and the prior art orientation of mounting for print head assemblies.

FIG. 2 shows one embodiment of a print head assembly 5, used in such prior art printers. The assembly 5 includes an upper print head portion including a print head body 21 mounted on housing 22 and having an inlet 23 for receiving ink. The body 21 has a passage leading to a print head cavity 24 and an outlet 29 (see FIG. 3) leading from the cavity 24 to and ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure break-up of the ink filuments into streams of uniformly spaced ink droplets.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Finally, in this embodiment, the lower print head assembly includes a predeterminedly configured and located wall member 28 which provides protection and air control functions for the printer apparatus.

The ink supply and circulation system of printers such as shown in FIG. 1 typically includes various ink conduits (i.e. lines) which form an ink recirulation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet to a junction between catcher return line 75 and the main ink return line 76. An ink return line 79 also extends from station 9 back to cartridge 8. An air bleed line 78 extends from main filter 61 back to cartridge 8 and an ink bypass line 77 extends from a juncture with line 73 also back to cartridge 8. The FIG. 3 system also includes an ink heater 61, a flow restrictor 62, final filter 63, head return valve 64, temperature sensor 65 and pressure sensor 66. As will be clear from subsequent descriptions, the present invention is not limited to use with the particular ink circulation line arrangement illustrated in FIG. 3.

Figure 3:
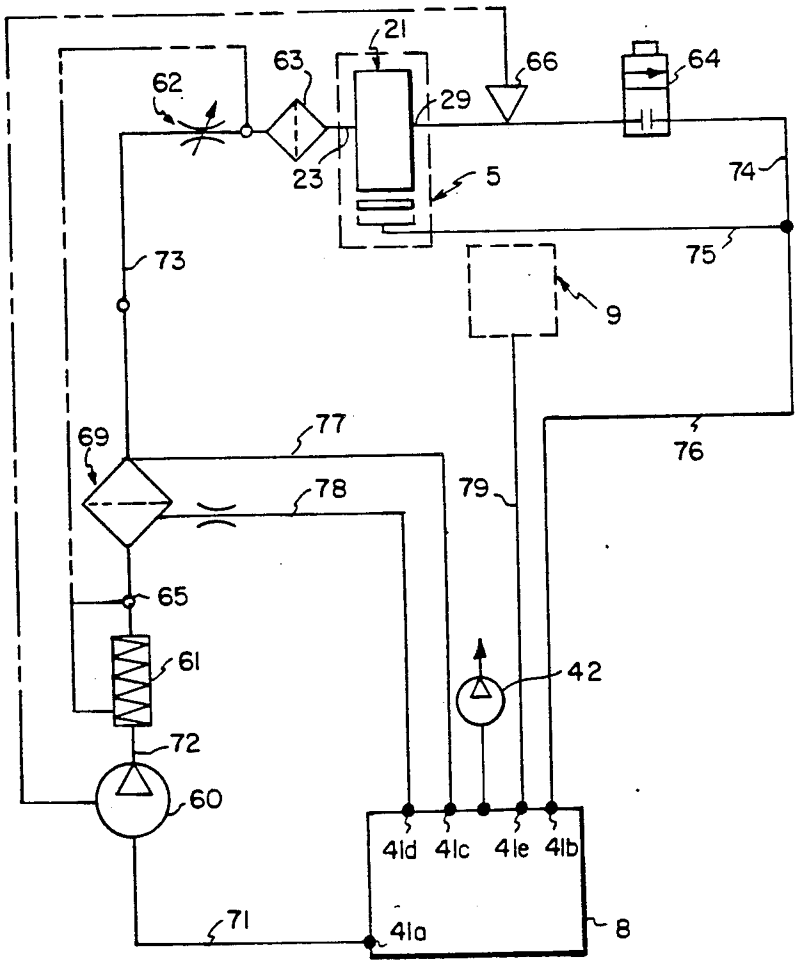
FIG. 3 (prior art)
FIG. 3 is a schematic diagram illustrating exemplary prior art ink circulation system components of continuous ink jet printers such as shown in FIG. 1.

As shown in FIGS. 1 and 3, cartridge 8 can be in a form that is constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect with lines 71, 76, 77, 78 and 79 upon insertion of the ink cartridge 8 into its mounting in the printer apparatus. In the prior art approach illustrated in FIG. 3, cartridge 8 is coupled to vacuum pump 42 to render the interior at sub-atmospheric pressure and affect ink return.

Figure 4:
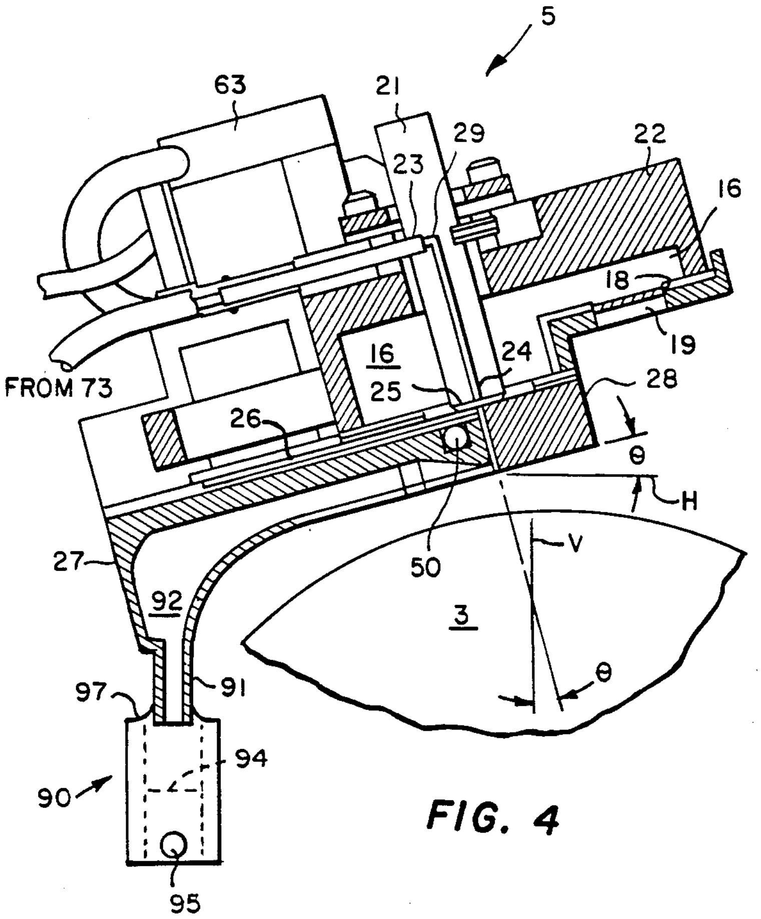
FIG. 4 is a side view of one preferred embodiment for print head construction, mounting and draining in accordance with the present invention.

Referring now to FIG. 4, it can be seen that the print head assembly 5′ in accord with the present invention is similar to the FIG. 2 print head assembly and like parts are given like numbers. However, the FIG. 4 embodiment of the present invention differs from the FIG. 2 embodiment in two important aspects. First, the print head assembly 5′ is mounted on carriage assembly 6 so that the droplet stream print path P thereof is at an angle $\theta$ with respect to the vertical V, indicating the upward direction when the printer is in its normal operating orientation. Because the catcher discharge passage is formed generally normal to the droplet print path P, the discharge passage slopes downwardly from the horizontal H by approximately the same angle $\theta$. In practice, the angle selected for $\theta$ has been found preferably to be about 15°; however, values of $\theta$ from about 5° to about 20° or more are also highly useful. In the FIG. 4 embodiment, the maximum $\theta$ value has been found to relate to preventing ink from overcoming surface tension and moving over the top of charge plate 26, in start-up modes. The minimum $\theta$ value was found to be delimited by an ink throwing defect that can occur if the gravity force for draining (i.e. slope of catcher return line) is too small. In such an instance, accelerations of the print head during traverse can sling ink out of the cater, if the $\theta$ value is too small.

Figure 7:
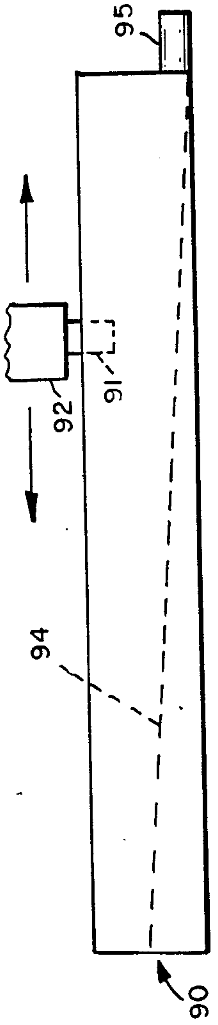
FIG. 7 is a side view of the FIG. 4 catch tray as it cooperates with a lower position of the catcher outlet.
Figure 8:
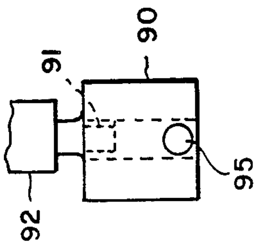
FIG. 8 is a end view of FIG. 7.

In order to complete the gravity drain system in accord with the present invention, it is desirable that the return line from the catcher outlet slope continuously downwardly to the ink reservoir. This presents little difficulty in stationary head printers; however, in traversing head printers special design features are desirable. Thus, FIG. 4–8 show one construction wherein a stationary though 90 is aligned below an outlet pipe 91 from the catcher passage 92. The pipe 91 slides within the trough 90 as the catcher traverse back and forth across the print zone so that ink exiting the catcher flows into the trough continuously during traversing movement of the print head. As can be seen in FIG. 7, the bottom 94 of trough 90 slopes downwardly to a drain 95 at one end which in turn couples to the downwardly directed ink return conduit 75′, so that ink from the trough will flow by gravity to the ink reservoir.

As can be best seen in FIGS. 4 and 7 the top of wall 97 of trough 90 is formed with an elastomeric seal member having a central slit 98 that extends along the length of the tray. The member forming wall 97 can therefore receive the outlet pipe 91 from the catcher drain and seal the ink within the trough from excessive evaporation.

Figure 5:
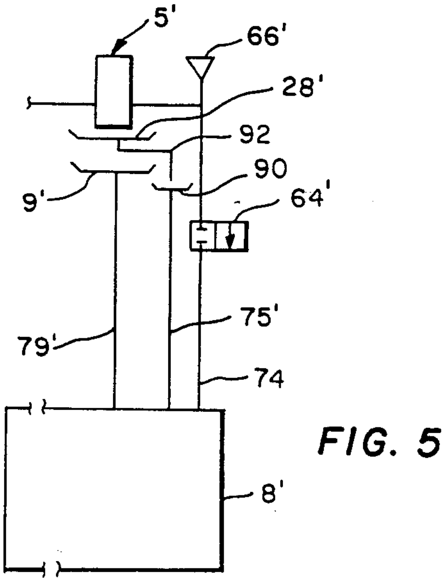
FIG. 5 is a partial circulation system diagram that is similar to FIG. 3, but which illustrates, schematically, the improved ink return system in accord with the FIG. 4 embodiment.
Figure 6:
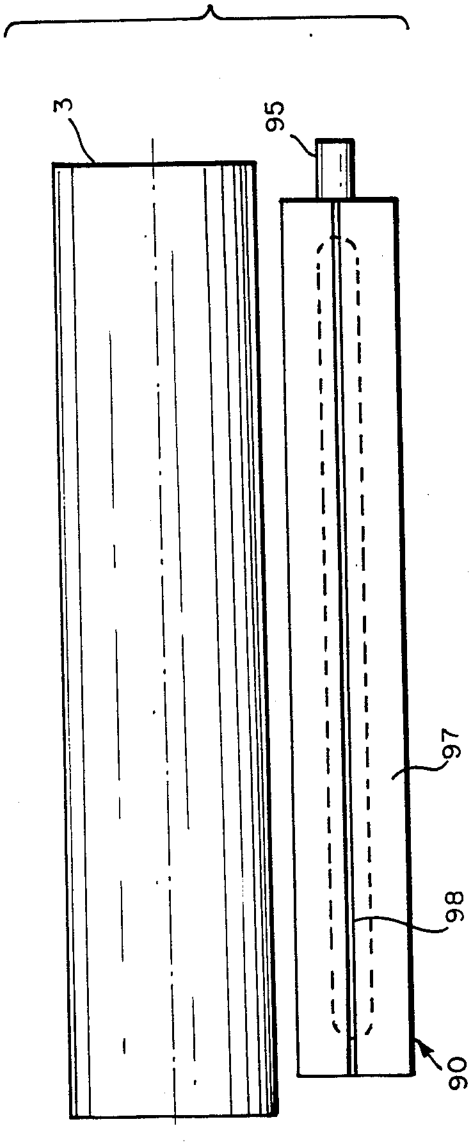
FIG. 6 is a top view of the drum and catch tray structure shown in FIG. 4, with the apparatus print head removed.

Referring to FIG. 5, the ink supply to print head 5′ is performed as described with respect to FIG. 3. However, in accord with the present invention ink is returned to reservoir 8′ without the assistance of a vacuum. Thus, ink caught by catcher 28' flows via the downwardly sloping catcher passage 92 through pipe 91 and into trough 90. After flowing across the sloped bottom wall 94 of the trough to the outlet 95, ink returns to reservoir 8' via catcher return conduit 75'.

In accord with another embodiement of the invention, a flexible conduit can be coupled to the catcher outlet 91 and constrained so that it slopes continuously downwardly, from catcher outlet to the downward ink return line, during all positions of print head traverse.

The invention has been described in detail with particular reference to preferred embodiments thereof, but it will be understood that variations and modifications can be effected within the spirit and scope of the invention.

We claim:

1. In continuous ink jet printer apparatus of the kind having: (i) a print head assembly movable along a traversing path and including droplet generator means for directing droplet streams toward a print zone, catcher means laterally offset from the droplet stream print path and droplet charge means for selectively effecting charge deflection of non-print drops from the droplet stream print path to said catcher means and (ii) an ink circulation system including an ink reservoir, means for providing ink from said ink reservoir to said droplet generator means and means for returning ink from said catcher to said ink reservoir, the improvement wherein:

(a) said droplet generator means is mounted so that, in the nominal operating orientation of said printer, said droplet stream print path is offset from vertical in the direction toward said catcher means;

(b) said catcher means includes a surface generally parallel to said droplet print path, an ink return passage located at the bottom of said surface and generally normal to said droplet print path and an outlet pipe at the end of said passage;

(c) said ink returning means includes:

(i) a stationary ink trough extending across said traversing path of said print head assembly in a locations to receive ink discharged from said outlet pipe; and (ii) conduit means, coupled to said ink trough, and extending to said ink reservoir with a negative slope along the full extent thereof;

whereby ink intercepted by said catcher means flows by gravity into said trough and thence to said ink reservoir.

2. A continuous ink jet printer comprising:

(a) a print head device mounted to move along a traverse path adjacent a linear print zone and including means for directing streams of ink droplets along a print path to portions of said print zone;

(b) ink supply means including an ink reservoir and means for supplying ink from said reservoir to said print head;

(c) a catcher, mounted to traverse with said print head and having an inlet adjacent the droplet print path and a discharge passage constructed and located to slope downwardly from said inlet to a catcher outlet; and (d) a stationary trough located along the length of said traverse path to receive ink from said catcher outlet during traverse thereof and having an ink return means sloping continuously downwardly from said catcher oulet toward said ink reservoir.

3. In continuous ink jet printer apparatus of the kind having a print head assembly including generator means for directing droplet streams toward a print zone, and catcher means laterally offset from the droplet stream print path and droplet charge means for selectively effecting charge deflection of non-print drops from the droplet stream print path to said catcher means the improvement wherein:

(a) said generator means is mounted so that, in the nominal operating orientation of said printer, said droplet stream print path is offset from vertical in the range of 50° to 20° in the direction toward said catch means; and (b) said catcher means includes a surface generally parallel to said droplet print path and an ink return passage located at the bottom of said surface and generally normal to said droplet print path whereby ink intercepted by said catcher means flows by gravity from said catcher.

* * * * *